(12) United States Patent
Walde

(10) Patent No.: US 11,827,575 B2
(45) Date of Patent: Nov. 28, 2023

(54) SYSTEM AND METHOD FOR INHIBITING PYRRHOTITE-CAUSED DAMAGE TO CONCRETE STRUCTURES

(71) Applicant: Robert Ashley Walde, Haymarket, VA (US)

(72) Inventor: Robert Ashley Walde, Haymarket, VA (US)

( * ) Notice: Subject to any disclaimer, the term of this patent is extended or adjusted under 35 U.S.C. 154(b) by 478 days.

(21) Appl. No.: 17/161,473

(22) Filed: Jan. 28, 2021

(65) Prior Publication Data

US 2021/0238106 A1 Aug. 5, 2021

Related U.S. Application Data

(60) Provisional application No. 62/969,553, filed on Feb. 3, 2020.

(51) Int. Cl.

| | | |
|---|---|---|
| C04B 41/45 | (2006.01) | |
| C04B 41/50 | (2006.01) | |
| C04B 41/49 | (2006.01) | |
| C04B 41/48 | (2006.01) | |
| C04B 111/72 | (2006.01) | |
| C04B 111/27 | (2006.01) | |
| C04B 111/26 | (2006.01) | |

(52) U.S. Cl.
CPC ...... C04B 41/4535 (2013.01); C04B 41/4501 (2013.01); C04B 41/4515 (2013.01); C04B 41/4884 (2013.01); C04B 41/4955 (2013.01); C04B 41/4961 (2013.01);
(Continued)

(58) Field of Classification Search
CPC ............ C04B 41/4535; C04B 41/4501; C04B 41/4515; C04B 41/4884; C04B 41/4955; C04B 41/4961; C04B 41/5024; C04B 2111/26; C04B 2111/27; C04B 2111/723; C04B 41/009; C04B 41/52; C04B 41/71; C04B 28/02; C04B 2103/61; C04B 41/46; C04B 41/522; C04B 41/5089; C04B 41/4922; C04B 41/4853
See application file for complete search history.

(56) References Cited

FOREIGN PATENT DOCUMENTS

| | | | | |
|---|---|---|---|---|
| JP | 2008280723 A | * | 11/2008 | ........... C04B 41/009 |
| KR | 102164414 B1 | * | 10/2020 | |

OTHER PUBLICATIONS

Oliveira et al., "Evolution of pyrrhotite oxidation in aggregates for concrete," Materiales de Construcción 64 (316), Oct.-Dec. 2014, e038. (Year: 2014).*

(Continued)

*Primary Examiner* — William P Fletcher, III

(57) ABSTRACT

A system and a method are provided for inhibiting pyrrhotite-caused damage to concrete structures. The system includes at least one concrete structure, a quantity of migratory corrosion-inhibiting solution, a quantity of concrete reinforcing solution, and a water sealing substance. The concrete structure can be any structure where the concrete aggregate contains pyrrhotite. The quantity of migratory corrosion-inhibiting solution is applied to the concrete structure to prevent further oxidation of pyrrhotite within the concrete structure. The quantity of concrete reinforcing solution is applied to the concrete structure to lower the porosity of the concrete structure and strengthen the overall integrity of the concrete structure. The water sealing substance is applied to the concrete structure to repel water from the concrete structure preventing any further chemical reactions with the pyrrhotite.

18 Claims, 9 Drawing Sheets

(52) U.S. Cl.
CPC ....... *C04B 41/5024* (2013.01); *C04B 2111/26* (2013.01); *C04B 2111/27* (2013.01); *C04B 2111/723* (2013.01)

(56) References Cited

OTHER PUBLICATIONS

"Concrete Crack Injection," webpage: Attack A Crack (2016), retrieved from <https://web.archive.org/web/02170422024933/https://attackacrack.com/concrete-crack-injection> on Jul. 14, 2023. (Year: 2016).*

"Carbon Fiber Stitches," webpage: Attack A Crack (2016), retrieved from <https://web.archive.org/web/0217042202385/https://attackacrack.com/carbon-fiber-stitches> on Jul. 14, 2023. (Year: 2016).*

FEMA Case Study "Connecticut's Crumbling Concrete: Coordinating Federal Resources for a Non-Stafford Act Event," Guidance Development Office, Interagency Coordination Division, Recovery, FEMA, Dec. 2018. (Year: 2018).*

D. Jana, "Pyrrhotite Epidemic in Eastern Connecticut: Diagnosis and Prevention," ACI Materials Journal 117 (1), Jan. 2020. (Year: 2020).*

Kevin E. Miller, "Understanding the Effects of Pyrrhotite in Concrete," K.E. Miller, LLC (2021), retrieved from <https://crumblingfoundations.org/wp-content/uploads/2021/04/KeMiller_Newsletter2.pdf> on Jul. 14, 2023. (Year: 2021).*

L.S. Rasheed, Using of Epoxy Resins to Repair the Cracks in Concrete Structure, retrieved from https://www.iasj.net/iasj/download/11e877751f56ed57 on Jul. 14, 2023 (original date unknown). (Year: None).*

* cited by examiner $FeS_2 + 3O_2 + H_2O \text{ -------- } FeSO_3 + H_2SO_4$

FIG. 1

$$Ca(OH)_2 + H_2SO_4 \dashrightarrow 2H_2O + CaSO_4$$

FIG. 2

SYSTEM AND METHOD FOR INHIBITING PYRRHOTITE-CAUSED DAMAGE TO CONCRETE STRUCTURES

The current application claims a priority to the U.S. Provisional Patent application Ser. No. 62/969,553 filed on Feb. 3, 2020.

FIELD OF THE INVENTION

The present invention relates generally to preventing concrete damage. More specifically, the present invention is a process and resulting product for inhibiting and preventing damage to concrete where the concrete aggregate contains pyrrhotite.

BACKGROUND OF THE INVENTION

Iron sulfide inclusions in stone is called pyrrhotite and when used as aggregate in concrete causes damage in the form of cracks and crumbling of concrete foundations in buildings. This is a severe problem in the New England area of U.S.A., particularly Connecticut, and results in significant damage to homes and buildings. It costs about $250,000 to remove and replace the pyrrhotite-caused crumbling foundation of one house. A method for inhibiting and preventing the pyrrhotite caused crumbling of building concrete foundations would be of great economic value and utility.

The concrete damage is caused by a multiple stage sequence of chemical reactions forming an expanding byproduct that puts pressure on the concrete cement causing the concrete mass to expand and result in formation of cracks and eventual crumbling.

In simple terms for demonstration purposes, pyrrhotite can be expressed as iron sulfide or $FeS_2$. The degradation process starts with oxygen in the air penetrating the concrete and causing oxidation of the iron sulfide and reaction with water in the concrete, which produces sulfuric acid as shown in FIG. 1.

The sulfuric acid reacts with the free calcium compounds in the concrete cement in the form of calcium oxide and hydroxide or for chemical example purposes $Ca(OH)_2$ as shown in FIG. 2 to form calcium sulfate which expands putting pressure on the concrete cement that results in formation of cracks.

Considering the chemical reactions in FIGS. 1 and 2, it was conceived that incorporating with pyrrhotite containing concrete means for inhibiting the oxidation of iron sulfide, reducing concrete water content, and increasing concrete cement strength would serve to inhibit the expansion causing reactions and make the concrete less susceptible to crack formation.

Therefore, an objective of the present invention is to provide a system and method for inhibiting pyrrhotite-caused damage to concrete structures. The present invention includes solutions and substances for application to the surface of concrete that migrate from the surface and inhibit oxidation or corrosion of iron, reduce concrete cement porosity, increase strength, and repel water from the surface.

BRIEF DESCRIPTION OF THE DRAWINGS

FIG. 1 is depicting a chemical reaction of the degradation process which starts with oxygen in the air penetrating the concrete and causing oxidation of the iron sulfide and reaction with water in the concrete, which produces sulfuric acid.

Figure 2:
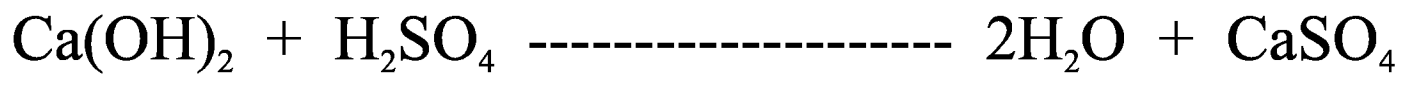

FIG. 2 is depicting a chemical reaction of sulfuric acid reacting with the free calcium compounds in the concrete cement in the form of calcium oxide and hydroxide to form calcium sulfate, which expands putting pressure on the concrete cement that results in formation of cracks.

DETAIL DESCRIPTIONS OF THE INVENTION

All illustrations of the drawings are for the purpose of describing selected versions of the present invention and are not intended to limit the scope of the present invention.

In reference to FIGS. 3 through 9, the present invention is a system and method for inhibiting pyrrhotite-caused damage to concrete structures. The system of the present invention includes at least one concrete structure, a quantity of migratory corrosion-inhibiting solution, a quantity of concrete-reinforcing solution, and a water sealing substance (Step A). The concrete structure can be any structure where the concrete aggregate contains pyrrhotite. The quantity of migratory corrosion-inhibiting solution prevents further oxidation of pyrrhotite within the concrete structure. The quantity of concrete-reinforcing solution lowers the porosity of the concrete structure and strengthens the overall integrity of the concrete structure. The water sealing substance repels water from the concrete structure preventing any further chemical reactions with the pyrrhotite.

Figure 3:
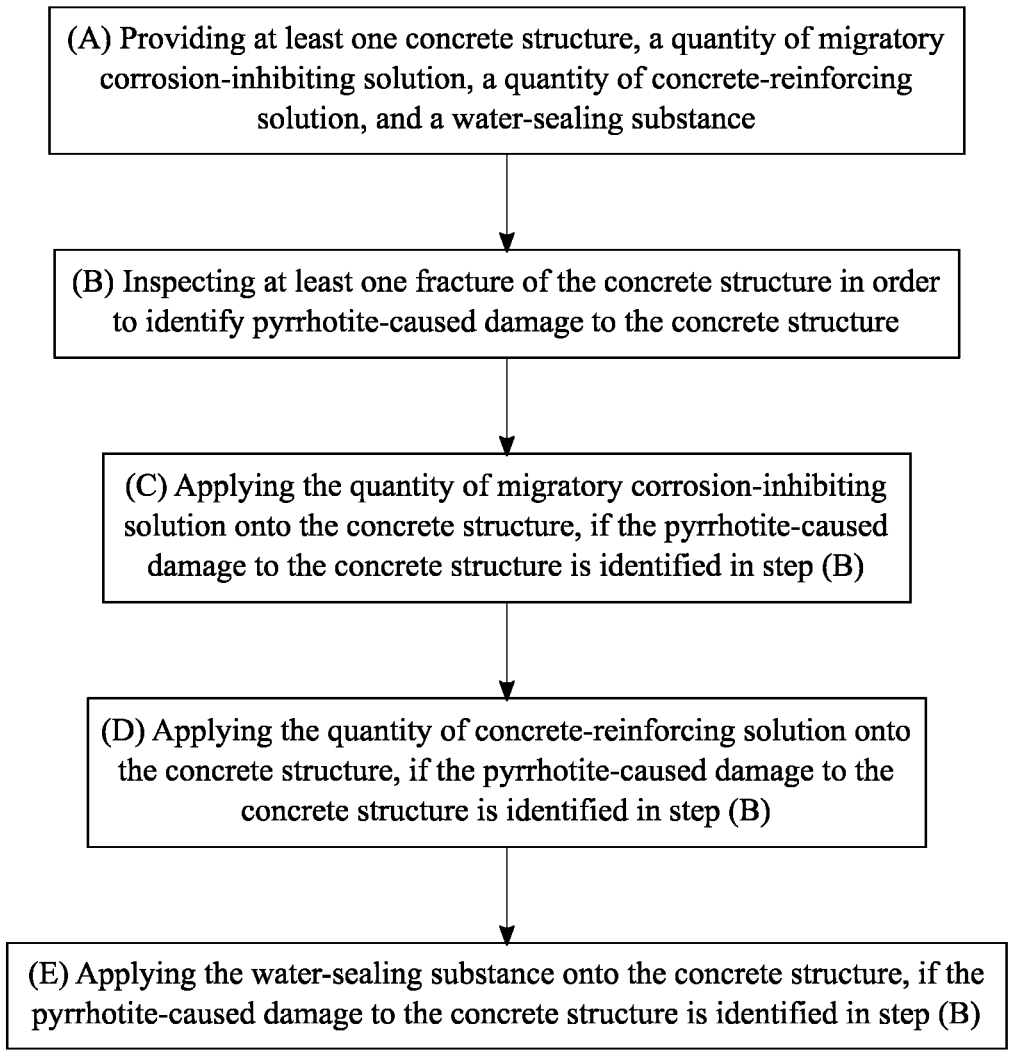
FIG. 3 is a flowchart illustrating the overall process for the method of the present invention.
Figure 4:
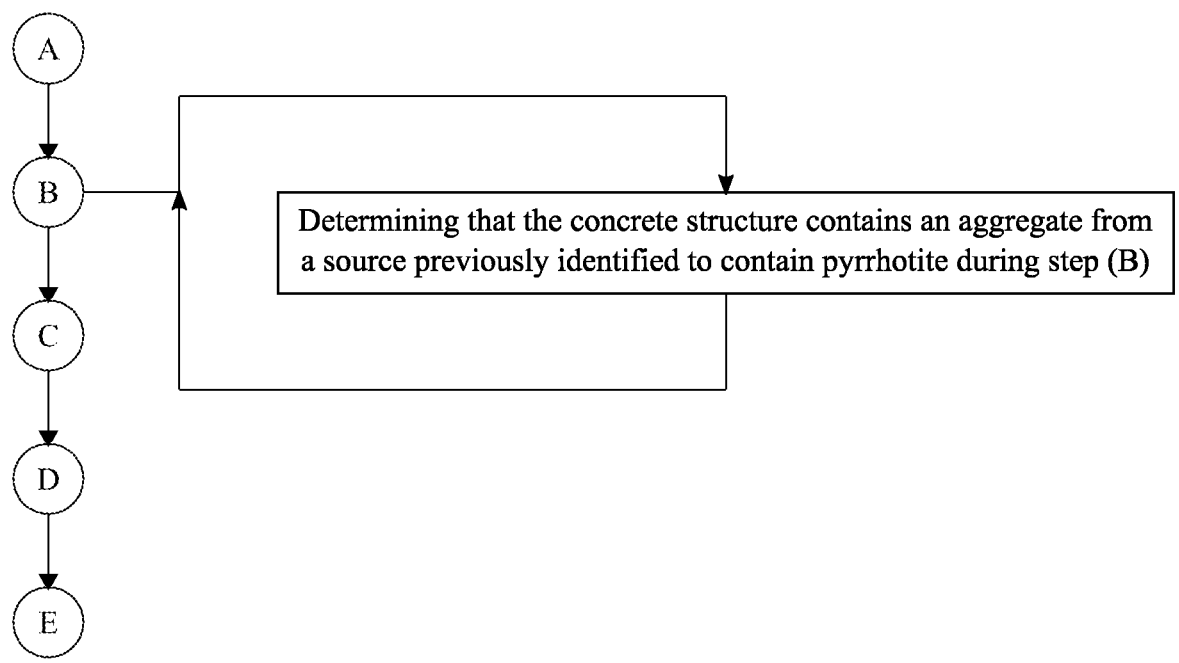
FIG. 4 is a flowchart illustrating a subprocess of identifying pyrrhotite-caused damage.

With reference to FIG. 3, the method of the present invention follows an overall process in order to inhibit pyrrhotite-caused damage to the concrete structure. First, at least one fracture of the concrete structure must be inspected in order to identity pyrrhotite-caused damage to the concrete structure (Step B). The fracture may be any defect in the concrete structure such as, but not limited to, a crack or instance of crumbling. In further detail, Step B is performed in order to verify that the concrete aggregate contains pyrrhotite due to the present invention being only for concrete structures that have been damaged from pyrrhotite chemical reactions. The quantity of migratory corrosion-inhibiting solution is applied onto the concrete structure, if the pyrrhotite-caused damage to the concrete structure is identified in Step B (Step C). Thus, the concrete structure becomes resistant to corrosion which prevents any further pyrrhotite-caused damage. Then, the quantity of concrete-reinforcing solution is applied onto the concrete structure, if the pyrrhotite-caused damage to the concrete structure is identified in Step B (Step D). Thus, the concrete structure becomes less porous and the integrity of the concrete structure is strengthened. Due to concrete containing approximately 15% hydraulic cement that is about 20% porous, creating a total porosity in the total concrete mass of 3%, air and water can penetrate through the concrete. Thus, the quantity of migratory corrosion-inhibiting solution and the quantity of concrete-reinforcing solution can penetrate through the concrete structure. The water sealing substance is applied onto the concrete structure, if pyrrhotite-caused damage to the concrete structure is identified in Step B (Step E). Thus, the concrete structure becomes water repellent in order to prevent any further chemical reactions with the pyrrhotite.

As mentioned previously, the concrete structure must be a structure where the concrete aggregate contains pyrrhotite. In order to best verify this and with reference to FIG. 3, it may be determined that the concrete structure contains an aggregate from a source previously identified to contain pyrrhotite during Step B. For example, the concrete structure may be taken from the foundation such as, but not limited to, the Birch Grove school where it is confirmed that the concrete structures there are deteriorated due to pyrrhotite containing aggregate. Alternatively and with reference to FIG. 4, a petrographic analysis may be executed on the concrete structure during Step B in order to verify pyrrhotite-caused damage. The petrographic analysis is preferably executed using stereomicroscopy and polarized light microscopy.

Figure 5:
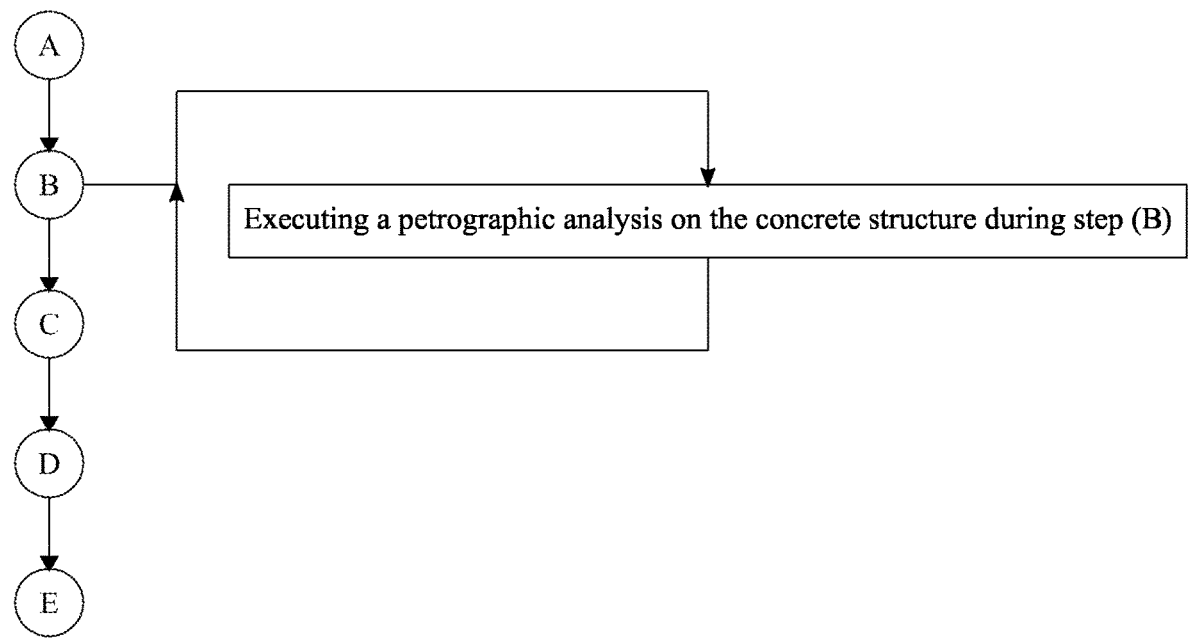
FIG. 5 is a flowchart illustrating an alternative subprocess of identifying pyrrhotite-caused damage.

In order to optimally apply the quantity of migratory corrosion-inhibiting solution and with reference to FIG. 5, the system of the present invention may further include a vacuum pressure injection device. The quantity of migratory corrosion-inhibiting solution is applied onto the concrete structure with the vacuum pressure injection device during Step C. In more detail, the vacuum pressure injection device creates a vacuum until a stable pressure has been reached followed by the release of the quantity of migratory corrosion-inhibiting solution into an evacuated microspore in the concrete structure.

Figure 6:
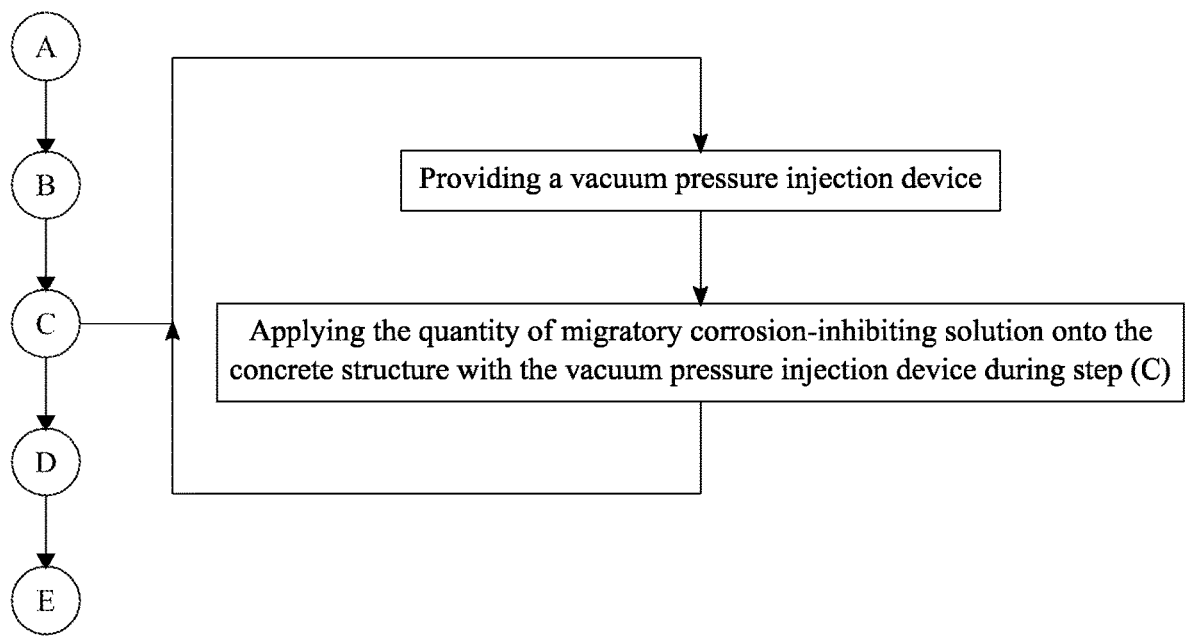
FIG. 6 is a flowchart illustrating a subprocess of applying the migratory corrosion-inhibiting solution onto the concrete structure.
Figure 7:
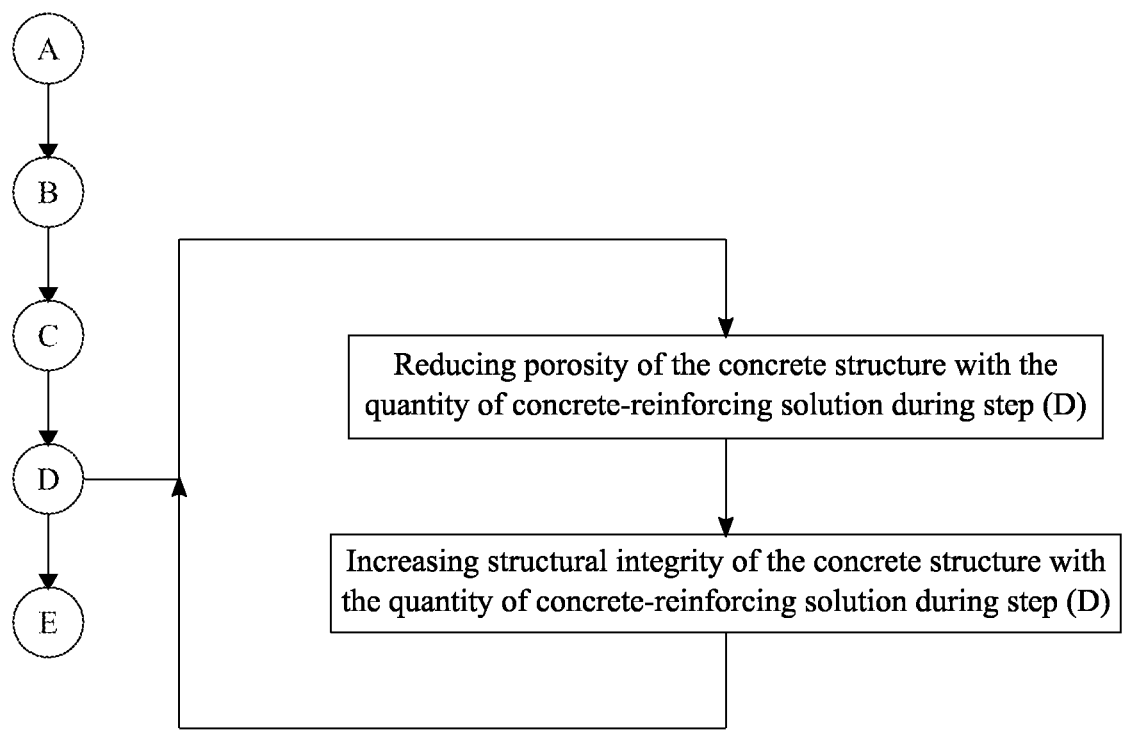
FIG. 7 is flowchart illustrating subprocesses that occur from applying the concrete reinforcing solution onto the concrete structure.

With reference to FIG. 6, the quantity of concrete-reinforcing solution is used for two main objectives when applied to the concrete structure. First, the quantity of concrete-reinforcing solution reduces the porosity of the concrete structure during Step D. In further detail, the concrete-reinforcing solution seals the porosity of the concrete structure in order to prevent air and water from penetrating into the concrete structure. The quantity of concrete-reinforcing solution also increases the structural integrity of the concrete structure during Step D. In further detail, the concrete structure becomes more resistant to further fracturing from chemical reactions that occur due to the pyrrhotite.

In order for the quantity of migratory corrosion-inhibiting solution to be most effective, the following characteristics are preferred. The quantity of migratory corrosion-inhibiting solution includes an active ingredient, and this active ingredient is between 1 percent by weight (wt. %) to 20 wt. % of the quantity of migratory corrosion-inhibiting solution. The active ingredient of the quantity of migratory corrosion-inhibiting solution is preferably organic amine carboxylate. Organic amine carboxylate is effective in preventing iron corrosion. Additionally, the quantity of migratory corrosion-inhibiting solution is applied at a coverage ratio between 5 to 150 square feet per gallon ($ft.^2/gal$). This coverage ratio assures that the quantity of migratory corrosion-inhibiting solution is distributed throughout the concrete structure in an effective fashion.

In order for the quantity of concrete-reinforcing solution to be most effective, the following characteristics are preferred. The quantity of concrete-reinforcing solution includes an active ingredient, and this active ingredient is between 10 wt. % to 30 wt. % of the quantity of concrete-reinforcing solution. The active ingredient of the quantity of concrete-reinforcing solution is preferably alkaline silicate. Alkaline silicate is effective in sealing the porosity of concrete and strengthening the structural integrity of concrete. Additionally, the quantity of concrete-reinforcing solution is applied at a coverage ratio between 75 to 150 $ft.^2/gal$. This coverage ratio assures that the quantity of concrete-reinforcing solution is distributed throughout the concrete structure in an effective fashion.

In one embodiment of the water-sealing substance, the water-sealing substance may be a quantity of water-sealing solution. In further detail, the quantity of water-sealing solution is preferably a spray-on solution that makes the concrete structure water-repellent. The quantity of water-sealing solution includes an active ingredient, and this active ingredient is between 10 wt. % to 100 wt. % of the quantity of water-sealing solution. The active ingredient is preferably either organic silane or organic siloxane. Both organic silane and organic siloxane are effective in adding water-repellent properties to a structure. Additionally, the quantity of water-sealing solution is applied at a coverage ratio between 75 to 150 $ft.^2/gal$. This coverage ratio assures that the quantity of water-sealing solution is distributed throughout the concrete structure in an effective fashion.

Figure 8:
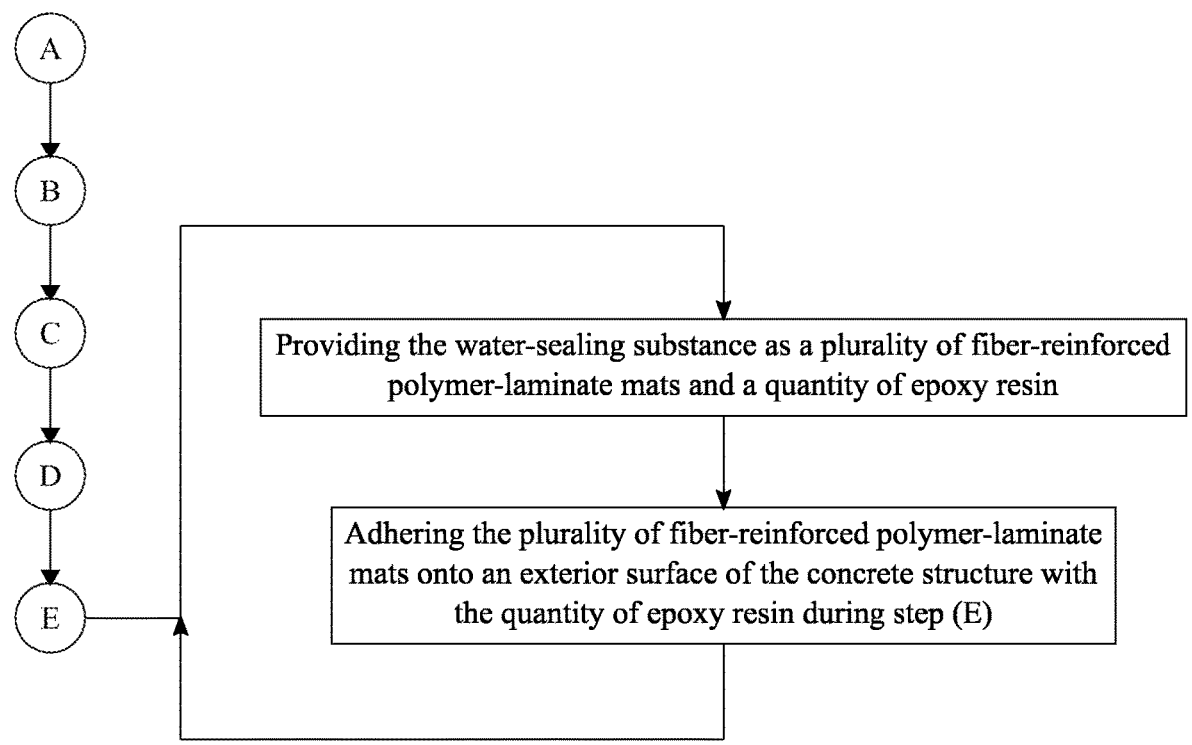
FIG. 8 is a flowchart illustrating a subprocess of applying the water-sealing substance onto the concrete structure.

Alternatively and with reference to FIG. 8, the water-sealing substance may be a plurality of fiber-reinforced polymer-laminate mats and a quantity of epoxy resin. In further detail, the plurality of fiber-reinforced polymer-laminate mats is a set of flat pieces of material that are attached onto the concrete structure in order to prevent water from penetrating into the concrete structure. The plurality of fiber-reinforced polymer-laminate mats is primarily made of a material such as, but not limited, glass or carbon fiber. Further, the epoxy resin is a water-resistant adhesive that creates a strong bond between two surfaces. Thus, the plurality of fiber-reinforced polymer-laminate mats is adhered onto an exterior surface of the concrete structure with the quantity of epoxy resin during Step E. This allows the water-sealing substance to prevent water from penetrating into the concrete structure.

Figure 9:
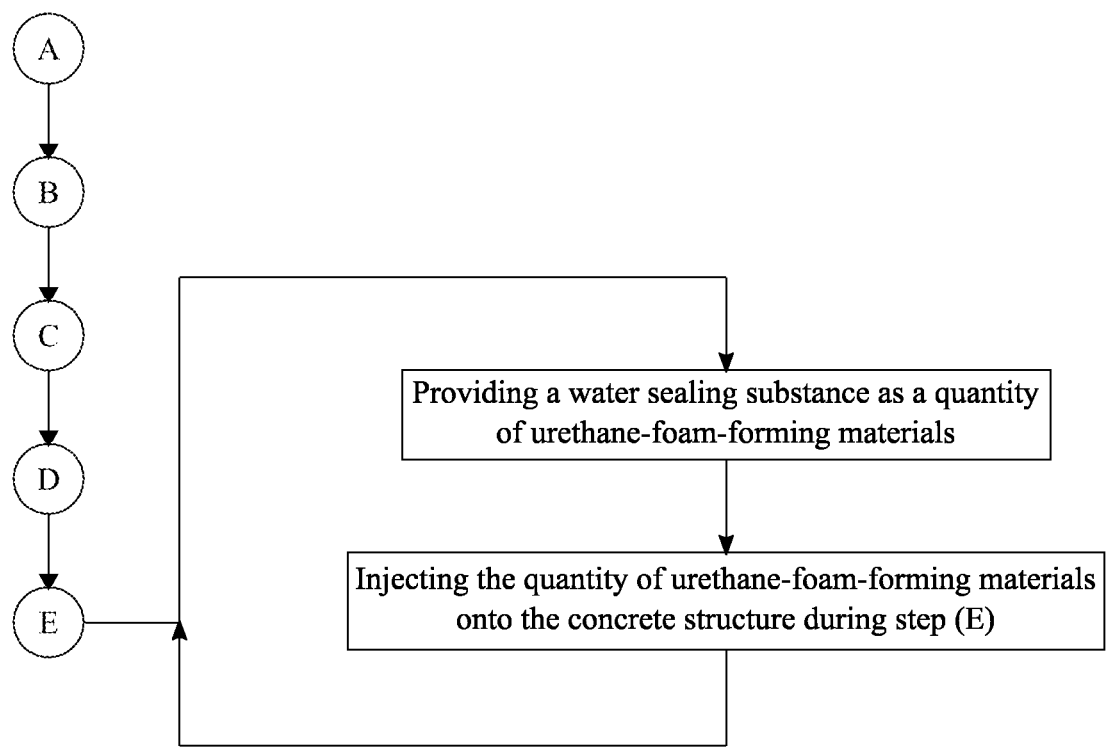
FIG. 9 is a flowchart illustrating an alternative subprocess of applying the water-sealing substance onto the concrete structure.

As another alternative and with reference to FIG. 9, the water-sealing substance may be a quantity of urethane-foam-forming materials. The quantity of urethane-foam-forming materials includes a quantity of isocyanate, an activator, and a quantity of water. The quantity of urethane-foam-forming materials is injected onto the concrete structure during Step E. In further detail, a quantity of urethane foam is formed within the concrete structure by drilling holes in an exposed exterior surface of the concrete structure and injecting a mixture of the quantity of isocyanate and the activator into the drilled holes. Then, the quantity of water is injected to activate a conversion reaction and to form the quantity of urethane foam. Thus, the quantity of urethane foam acts as a water barrier in order to prevent water from penetrating into the concrete structure.

Although the invention has been explained in relation to its preferred embodiment, it is to be understood that many other possible modifications and variations can be made without departing from the spirit and scope of the invention as hereinafter claimed.

What is claimed is:
1. A method for inhibiting pyrrhotite-caused damage to concrete structures, the method comprising the steps of:

(A) providing at least one concrete structure, a quantity of migratory corrosion-inhibiting solution, a quantity of concrete-reinforcing solution, and a water-sealing substance;
(B) inspecting at least one fracture of the concrete structure in order to identify pyrrhotite-caused damage to the concrete structure;
(C) applying the quantity of corrosion-inhibiting solution onto the concrete structure, if the pyrrhotite-caused damage to the concrete structure is identified in step (B);
(D) applying the quantity of concrete-reinforcing solution onto the concrete structure, if the pyrrhotite-caused damage to the concrete structure is identified in step (B); and
(E) applying the water-sealing substance onto the concrete structure, if the pyrrhotite-caused damage to the concrete structure is identified in step (B).

2. The method as claimed in claim 1 further comprising the step of:
determining that the concrete structure contains an aggregate from a source previously identified to contain pyrrhotite during step (B).

3. The method as claimed in claim 1 further comprising the step of:
executing a petrographic analysis on the concrete structure during step (B).

4. The method as claimed in claim 1 further comprising the steps of:
providing a vacuum pressure injection device; and
applying the quantity of migratory corrosion-inhibiting solution onto the concrete structure with the vacuum pressure injection device during step (C).

5. The method as claimed in claim 1 further comprising the steps of:
reducing porosity of the concrete structure with the quantity of concrete-reinforcing solution during step (D); and
increasing structural integrity of the concrete structure with the quantity of concrete-reinforcing solution during step (D).

6. The method as claimed in claim 1, wherein the quantity of migratory corrosion-inhibiting solution includes an active ingredient, and wherein the active ingredient is between 1 percentage by weight (wt. %) to 20 wt. % of the quantity of migratory corrosion-inhibiting solution.

7. The method as claimed in claim 6, wherein the active ingredient of the quantity of migratory corrosion-inhibiting solution is organic amine carboxylate.

8. The method as claimed in claim 1, wherein the quantity of migratory corrosion-inhibiting solution is applied at a coverage ratio between 5 to 150 square feet per gallon (ft.$^2$/gal.).

9. The method as claimed in claim 1, wherein the quantity of concrete-reinforcing solution includes an active ingredient, and wherein the active ingredient is between 10 wt. % to 30 wt. % of the quantity of concrete-reinforcing solution.

10. The method as claimed in claim 9, wherein the active ingredient of the quantity of concrete-reinforcing solution is alkaline silicate.

11. The method as claimed in claim 1, wherein the quantity of concrete-reinforcing solution is applied at a coverage ratio between 75 to 150 ft.$^2$/gal.

12. The method as claimed in claim 1, wherein the water-sealing substance is a quantity of water-sealing solution, and wherein the quantity of water-sealing solution includes an active ingredient, and wherein the active ingredient is between 10 wt. % to 100 wt. % of the quantity of water-sealing solution.

13. The method as claimed in claim 12, wherein the active ingredient of the quantity of water-sealing solution is organic silane.

14. The method as claimed in claim 12, wherein the active ingredient of the quantity of water-sealing solution is organic siloxane.

15. The method as claimed in claim 1, wherein the water-sealing substance is a quantity of water-sealing solution, and wherein the quantity of water-sealing solution is applied at a coverage ratio between 75 to 150 ft.$^2$/gal.

16. The method as claimed in claim 1 further comprising the steps of:
providing the water-sealing substance as a plurality of fiber-reinforced polymer-laminate mats and a quantity of epoxy resin; and
adhering the plurality of fiber-reinforced polymer-laminate mats onto an exterior surface of the concrete structure with the quantity of epoxy resin during step (E).

17. The method as claimed in claim 1 further comprising the steps of:
providing a water sealing substance as a quantity of urethane-foam-forming materials; and
injecting the quantity of urethane-foam-forming materials onto the concrete structure during step (E).

18. The method as claimed in claim 17, wherein the quantity of urethane-foam-forming materials includes a quantity of isocyanate, an activator, and a quantity of water.

\* \* \* \* \*